United States Patent
Tang et al.

(10) Patent No.: US 8,612,079 B2
(45) Date of Patent: Dec. 17, 2013

(54) OPTIMIZING SYSTEM PERFORMANCE USING STATE OF HEALTH INFORMATION

(75) Inventors: Xidong Tang, Royal Oak, MI (US); Mutasim A. Salman, Rochester Hills, MI (US); Yilu Zhang, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/325,132

(22) Filed: Dec. 14, 2011

(65) Prior Publication Data
US 2013/0158755 A1    Jun. 20, 2013

(51) Int. Cl.
*B60L 9/00* (2006.01)

(52) U.S. Cl.
USPC .......... 701/22; 701/31.4; 701/32.9; 701/34.4; 701/36; 702/63; 706/52

(58) Field of Classification Search
USPC .......... 701/36, 22, 31.4, 32.9, 34.4, 123, 29.1, 701/29.7, 29, 30.5, 30.6, 30.7, 31.1, 32.7, 3, 701/32.2, 63, 1; 702/63; 703/13; 705/305; 714/1; 320/134, 149, 132
See application file for complete search history.

(56) References Cited

U.S. PATENT DOCUMENTS

| | | | |
|---|---|---|---|
| 7,072,871 B1 * | 7/2006 | Tinnemeyer | 706/1 |
| 2005/0137764 A1 * | 6/2005 | Alvarez-Troncoso et al. | 701/36 |
| 2010/0057479 A1 * | 3/2010 | De et al. | 705/1 |
| 2010/0106357 A1 * | 4/2010 | Shin et al. | 701/29 |
| 2010/0138089 A1 * | 6/2010 | James | 701/22 |
| 2011/0202494 A1 * | 8/2011 | Shin et al. | 706/52 |
| 2012/0208672 A1 * | 8/2012 | Sujan et al. | 477/5 |
| 2013/0073222 A1 * | 3/2013 | Shin et al. | 702/34 |

\* cited by examiner

*Primary Examiner* — Tuan C. To
*Assistant Examiner* — Jelani Smith
(74) *Attorney, Agent, or Firm* — Quinn Law Group, PLLC

(57) ABSTRACT

A method for optimizing performance of a system includes determining, via a controller, a state of health (SOH) for each of a plurality of components of the system, and determining a state of function (SOF) of the system using the SOH of each component. The method includes estimating the remaining useful life (RUL) of the system using the system SOF, selecting a cost-optimal control strategy for the system using a costing model, and dynamically, i.e., in real time, executing the selected strategy to extend the estimated RUL. The method may include comparing the selected cost-optimal strategy to a calibrated performance threshold, and executing the selected strategy only when the selected strategy exceeds the threshold. A system includes first and second components and a controller. The controller dynamically executes the above method with respect to the components, which may be a traction motor and battery in one possible embodiment.

16 Claims, 2 Drawing Sheets

OPTIMIZING SYSTEM PERFORMANCE USING STATE OF HEALTH INFORMATION

TECHNICAL FIELD

The present disclosure relates to a method and an apparatus for determining state of health information of various components used in a system, and for optimizing system performance in real-time using the state of health information.

BACKGROUND

A system is a set of interacting and/or interdependent components functioning as a whole. Over time, each of the various components in a given system may degrade at different relative rates. Moreover, as some components tend to serve a more critical role than others in the overall function of the system, the degradation of a given component can uniquely impact system performance relative to degradation of the other components in the same system. For instance, a gradual degradation of certain vehicle sensors may affect measurement accuracy without causing an appreciable degradation in overall vehicle performance, while a degraded battery may significantly reduce the vehicle's ability to start or function in certain operating modes.

Various onboard diagnostic approaches may be used to measure the performance of a particular component relative to calibrated thresholds. For instance, it is common to measure a battery output voltage and compare this value to calibrated high/low voltage thresholds. An operator may be made aware of the need to repair a given component when the component is no longer functioning properly with respect to such thresholds. System function typically improves when a severely degraded component is eventually repaired. However, immediate repair is not always a convenient or desirable option.

SUMMARY

A method is disclosed herein that estimates component health in a system and dynamically controls, i.e., in real time, a function or operation of the system in response to the estimated health and other information as set forth below. Reactive threshold-based repair approaches of the type described above may be less than optimal for some users, particularly in the intervening time between diagnosis of a degraded component and its subsequent repair. The present approach operates differently by evaluating the current state of health of each component in a system, and by looking forward in time to estimate the particular manner in which each component in the system might age and, ultimately, degrade. The system is then dynamically controlled to extend the remaining useful life of the system.

A controller is in communication with the various components of the system, either directly or through communication over a communications bus with corresponding electronic control units (ECUs) of each component. The controller estimates the state of function (SOF), i.e., current level of performance, of the system as a function of the states of health (SOH) of the various components comprising the system. The effect of the components' individual SOH on the system SOF may be synergistic, i.e., the system SOF may be zero even when the SOH of the individual components remains above zero. System SOF is thus estimated or predicted in real time, recorded in memory of the controller, and used as set forth herein to control the system.

In particular, a method for controlling a system having a plurality of components includes determining, via a controller, an SOH for each of the components, and also determining an SOF of the system as a whole using the SOH of each of the components. The method further includes estimating the remaining useful life of the system using the SOF of the system, using a costing model to select a system control strategy which minimizes operating costs of the system while producing a threshold SOF and a threshold remaining useful life of the components, and executing the selected control strategy via the controller.

Another method for controlling the system includes using a sensor array to measure and record a set of current performance values for each of the components, and then calculating, via a controller, an SOH for each of the components by processing the recorded current performance values through an SOH model. The method also includes determining an SOF of the system using an SOF model that models the SOF of the system as a function of the corresponding SOH of each of the components, and estimating the remaining useful life of the system using an aging model. Additionally, the method may include processing a set of possible system control strategies through a component and/or system costing model to thereby estimate the cost of separately implementing each of the control strategies in the alternative, and selecting a system control strategy having an optimal cost relative to the other possible strategies, subject to performance and remaining useful life thresholds. The cost-optimal system control strategy is then executed via the controller to thereby extend the remaining useful life of the system.

A system is also disclosed herein having a first component, a second component, and a controller. The controller determines an SOH for each of the components, and also determines an SOF of the system using the SOH of each of the components. The controller then estimates the remaining useful life of the system using the SOF of the system, processes a set of control strategies through a costing model, and selects a system control strategy from the set of possible system control strategies which minimizes operating costs of the system while producing a threshold SOF and a threshold remaining useful life of the components. The controller dynamically executes the selected control strategy, thus optimizing performance of the system in real time.

The above features and advantages and other features and advantages of the present disclosure are readily apparent from the following detailed description of the best modes for carrying out the disclosure when taken in connection with the accompanying drawings.

DETAILED DESCRIPTION

Figure 1:
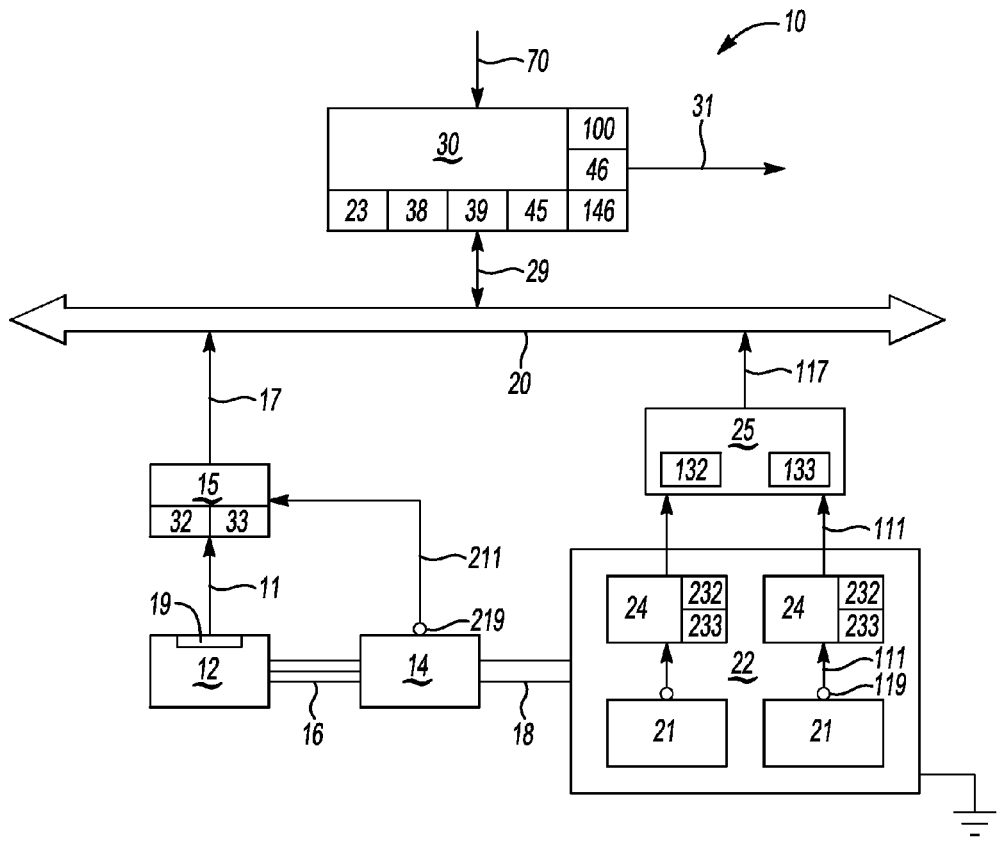
FIG. 1 is a schematic illustration of an example system having multiple components, each of which may be evaluated as set forth herein to optimize control of the system.

Referring to the Figures, wherein like reference numerals refer to like elements, a system 10 is shown schematically as an example electrical propulsion system. The system 10 may be used to electrically propel a hybrid, battery electric, or extended-range electric vehicle. Any system 10 having multiple components may be evaluated and dynamically controlled using the approach set forth herein, e.g., the alternative example system 10A shown in FIG. 1A. However, for illustrative consistency the particular embodiment of the system 10 as shown in FIG. 1 will be described below with reference to FIGS. 2-5.

The system 10 includes a plurality of components, including at least a first component 12 and a second component 22. In the particular embodiment of FIG. 1, the first and second components 12 and 22 are an electric traction motor and a rechargeable battery pack, respectively. A power inverter module (PIM) 14 may be electrically connected as yet another component to the first component/motor 12 via an alternating current (AC) bus 16. The PIM 14 may be electrically connected to the second component/battery pack 22 via a direct current (DC) bus 18 in the same embodiment. Other components not shown in FIG. 1 may include any required pulley/belts, loads, etc.

The function of the respective first and second components 12 and 22 may be expected to degrade over time due to age and wear. A state of function (SOF) of the system 10 as a whole may therefore degrade such that the system 10 eventually fails to perform properly. In this instance, the operator of the system 10 may be instructed via message or warning light to repair one or both of the first and second components 12 and 22 in the conventional manner. However, immediate repair may not be desirable. For instance, for a given operator repair may not be practicable or convenient, such as when operating in a remote location in which a repair facility may be difficult to find. Repair may not be immediately necessary in some instances given the particular function of the degrading component and/or the extent of its degradation.

A prognostic approach is therefore disclosed herein in which a controller 30 models and estimates the state of health (SOH) of the respective first and second components 12 and 22 in light of changing operating conditions and system use history, and then dynamically controls the system 10 using the estimated SOH to optimize performance or state of function (SOF) of the system 10. The specific approach is detailed below with reference to FIGS. 2-5.

Within the system 10 of FIG. 1, operation of the first component 12 may be controlled via a first electronic control unit (ECU) 15, e.g., a motor controller when the first component 12 is a traction motor or another electric motor. The first ECU 15 may include tangible/non-transitory memory 32 and a processor 33. Current performance values (arrow 11) are measured with respect to the first component 12 and recorded in memory 32. Example values for the current performance values (arrow 11) when the first component 12 is an electric traction motor may include average power consumption, peak current, resistance measurements, rotor speed, temperature, magnetic field strength, motor fault data, and/or any other information which sufficiently describes the performance of the motor. A sensor array 19 may be positioned with respect to the first component 12 and configured as needed to measure the required values (arrow 11) and transmit the same to the first ECU 15.

Likewise, operation of the second component 22 may be controlled via a second electronic control unit (ECU) 25. The second ECU 25 may likewise include tangible/non-transitory memory 132 and a processor 133. Additional current performance values (arrow 111) are measured with respect to the second component/battery pack 22 and recorded in memory 132. Example values for the current performance values (arrow 111) when the second component 22 is a battery pack may include internal resistance, capacitance, state of charge for any or all of a set of battery cells 21 of the second component/battery pack 22, charging rate, temperature, peak power, etc.

In such an embodiment, multiple battery cells 21 may be included within the second component 22, with each battery cell 21 optionally communicating with a third ECU 24 within the second component 22. The third ECU 24 may include memory 232 and a processor 233, and may be a single device or multiple devices as shown depending on the embodiment. Another sensor array 119 may be positioned with respect to the second component 22 and configured to measure the required values which collectively define the current performance signature (arrow 111), and to transmit the same to the second ECU 25. In a similar manner, the PIM 14 may be treated as yet another component, and thus may include another sensor array 219 which measures and transmits current performance signals (arrow 211) to the first ECU 15 as shown.

Figure 1A:
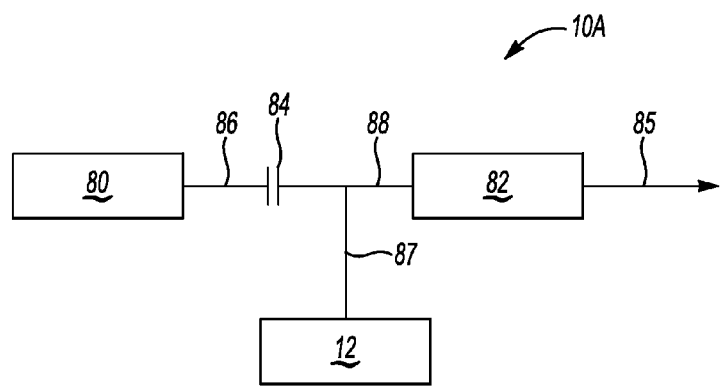
FIG. 1A is a schematic illustration of an alternative example system in the form of a vehicle.

Referring briefly to FIG. 1A, an alternative system 10A is shown as an example vehicle having a powertrain that includes a fourth component/internal combustion engine 80, the first component/traction motor 12 of FIG. 1, and a transmission 82. Engine torque from the engine 80 rotates an output member 86. Motor torque from the motor 12 rotates a rotor member 87. An input clutch 84 may be used to selectively connect the engine 80 to an input shaft 88 of the transmission 82. Output torque is delivered from the transmission 82 to a set of road wheels (not shown) via an output shaft 85. Other components of FIG. 1 are omitted for illustrative clarity, e.g., the second component/battery pack 22 which powers the first component/motor 12, the PIM 14, the controller 30, and all other structure of FIG. 1. As explained below, control of the powertrain portion of the example system 10A may be provided via the controller 30 as one possible dynamic control action.

Referring again to FIG. 1, the controller 30 is electrically connected to the respective first and second ECUs 15 and 25 via a communications bus 20, as well as any other ECUs used with other components when the system 10 includes more than two components as shown. The controller 30 may be a host machine, server, or other computing device which includes a central processing unit (CPU) 23 and memory 38 including but not limited to tangible/non-transitory memory on which is recorded instructions which embody the present method 100 of FIG. 5. The controller 30 may also include any required circuitry including but not limited to a high-speed clock, analog-to-digital (A/D) circuitry, digital-to-analog (D/A) circuitry, a digital signal processor, and any necessary input/output (I/O) devices and other signal conditioning and/or buffer circuitry. The controller 30 of FIG. 1 may receive system input signals (arrow 29) via the communications bus 20. The system input signals (arrow 29) collectively describe a first component health status (arrow 17) from the first ECU 15 and a second component health status (arrow 117) from the second ECU 25, as well as health statuses from any other components used in the system 10 in other embodiments.

The controller 30 may include a set of aging models 39 for the respective first and second components 12 and 22. As used herein, the term "aging model" refers to any device or software approach which estimates or predicts the degradation or deterioration of a given component over time, e.g., curves, formulas, lookup tables, etc. recorded in memory 38. The set of aging models 39 may model historic maintenance or contain statistical data describing the past performance of substantially similar components 12 and 22, for instance the same make and model of component used in a reference test, validation, or prior fielded version of the system 10. Where more components are used in the system 10, the set of aging models 29 may be expanded to include aging models for the additional components.

The controller 30 also includes a system function model 45 which processes information generated by the various aging models 39, as well as states of health (SOH) of the first and second components 12, 22 and system information (arrow 70) describing the operation of the system 10, e.g., vehicle speed, ambient temperature, temperature of the components 12, 22, driving behavior or history of a given operator of a vehicle having the system 10, geographical and/or topographical information describing driving routes taken by the operator, etc. Code embodying the system function model 45 is automatically executed by the controller 30 to estimate a system state of function (SOF). The controller 30 then uses the system SOF in the dynamic optimization of the system 10 as explained below.

As is understood in the art, a particular system's SOF may be mathematically represented as:

$$F(t)=F\{\theta_1(t),\theta_2(t),\ldots,\theta_n(t)\}$$

where $\theta$ represents the state of health (SOH) of a respective component $1, 2, \ldots n$. In a component aging model such as the aging models 39 of FIG. 1, the following mathematical equation may apply:

$$\theta i(t_f)=\Phi(t_f,t)\theta i(t).$$

where (i) is the component, $t_f$ is the time at the end of the service life of component (i), and $\Phi$ is an aging function, e.g., one of the aging functions 39, which represents the aging of component (i), as understood in the art. The remaining useful life (RUL) with respect to a calibrated threshold $\bar{F}$ of the system 10 is:

$$RUL=t_f|\geq \bar{F}|.$$

The controller 30 thus calculates and monitors the SOH of the respective first and second components 12 and 22, estimates the degradation rate and remaining useful life of the system 10 as a function of the degradation and remaining useful life of components 12, 22, and uses the component SOH and remaining useful life, the system function model 45, and aging models 39 to predict the SOH, remaining useful life, and future performance of the system 10 as a whole.

Also as part of this analysis, the controller 30 may evaluate the costs associated with implementing certain life-extending control strategies with respect to the system 10. For example, the controller 30 shown in FIG. 1 may use a component-level costing model 46 to estimate the cost $c_i(t)$ of extending the life of a given component (i), beyond a threshold $\bar{t}$, for instance:

$$c_i(t)=c_i(\Phi(t_f,t))|t_f\geq \bar{t}$$

A system-level costing model 146 may be used to evaluate the cost C(t) at the level of the system 10 of implementing a set of up to n life-extending control strategies $(c_1(t), \ldots c_n(t))$. The system-level costing model 146 may be mathematically represented as:

$$C(t)=C(c_1(t),c_2(t),c_3(t)\ldots,c_n(t))$$

The controller 30 then selects the optimal control strategy, i.e., the particular life-extending strategy that minimizes the cost C(t) subject to a threshold level ($\bar{P}$) of system function/performance P(t), i.e., $P(t)\geq\bar{P}$, and subject to the remaining useful life of the components 12, 22 and the system 10 being above corresponding thresholds. The selected control strategy may be thereafter commanded via an output signal (arrow 31) to dynamically control the system 10 and extend its remaining useful life. The above approach will now be explained with reference to FIGS. 2-5 as applied to the particular system 10 shown in FIG. 1.

Figure 2:
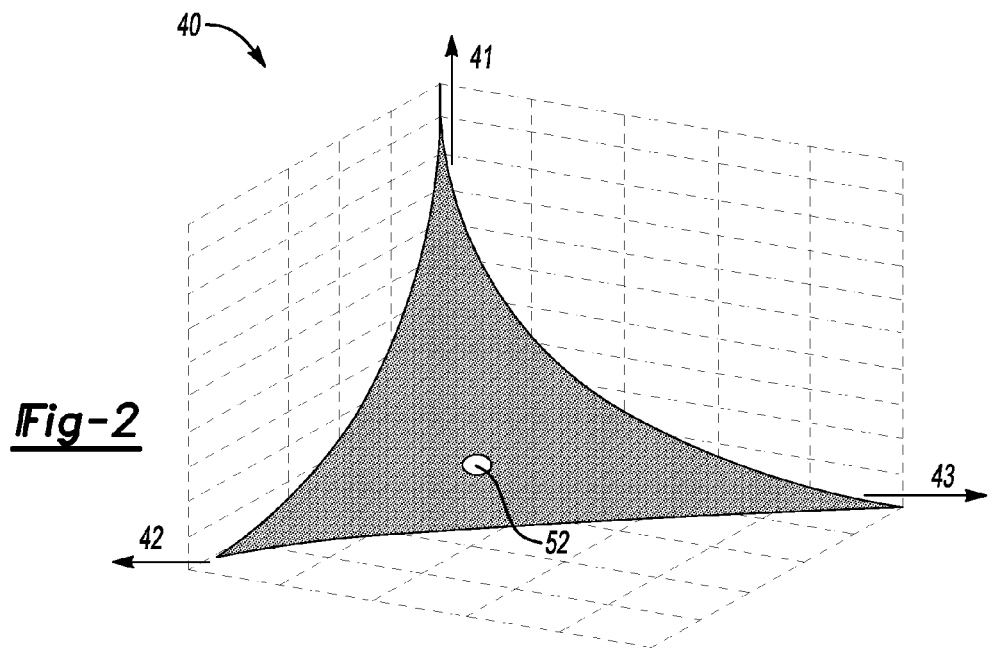
FIG. 2 is a three-axis time plot for diagnosing operation of the example system shown in FIG. 1.

Referring to FIG. 2, an operation space 40 is shown with respect to three axes 41, 42, and 43. In an example embodiment, axis 41 represents fuel economy of a vehicle using the system 10 of FIG. 1. Axis 43 represents the operating life of the system 10, and axis 42 represents a particular performance characteristic, e.g., motor speed, battery charge/discharge rate, etc. There exists an optimal operation point 52 within the operation space 40, as is well understood in the art. That is, optimal operation point 52 represents a point having an optimal trade off in the various parameters defining the operation space, here fuel economy (axis 41), life (axis 43), and performance (axis 42). The controller 30 of FIG. 1, in response to the particular SOF and SOH modeling steps set forth herein, can provide prognosis-based fault tolerance and automated life-extending strategies to ensure a prolonged operation at or near the optimal operation point 52 even as the first and second components 12 and 22 of FIG. 1 age and degrade.

For example, an HEV has an inherent redundancy in that it includes an internal combustion engine and a traction motor (s) as different prime movers. That is, an HEV may be propelled using an engine, motor, or a combination of the two. When the system 10 of FIG. 1 is used aboard an HEV, advanced fault mitigation and life extension is enabled without the need for redundant hardware. Thus, the controller 30 of FIG. 1 can optimize control of the respective first and second components 12, 22 and other subsystems in terms of the example operation space parameters of FIG. 2, or other parameters in different embodiments.

Figure 3:
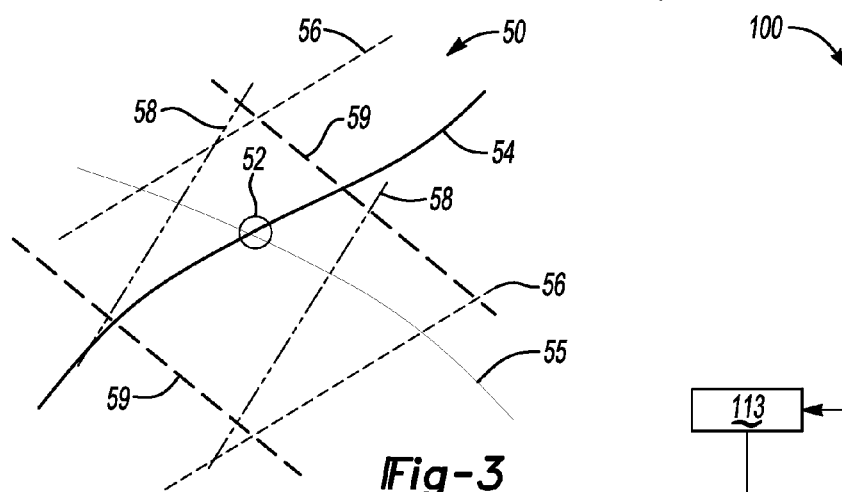
FIG. 3 is a schematic illustration of an optimal operating point of the system of FIG. 1 with respect to an example set of system constraints.
Figure 4:
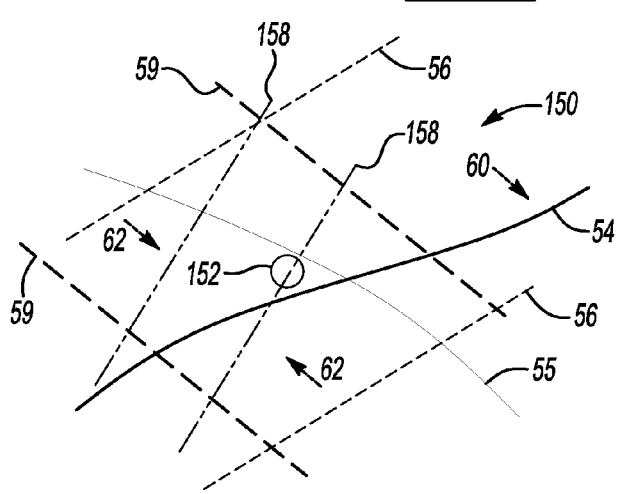
FIG. 4 is a schematic illustration of a shift in the optimal operating point of FIG. 3 as a result of changing system constraints.

FIGS. 3 and 4 together represent an example of a possible evolution of system optimization within the system 10 of FIG. 1. Constraints 50 of FIG. 3 include a set of constraints 56 determined by power electronics in the system, e.g., the PIM 14 of FIG. 1. Another set of constraints 59 is plotted of the first component/motor 12, along with a set of constraints 58 of the second component/battery 22. Also plotted are an optimal fuel economy curve 55 and a desired performance curve 54. The possibilities for location of the optimal operation point 52 is thus determined in FIG. 3 by the constraints 56, 58, and 59, which in turn reflect the SOH of the corresponding components, here the PIM 14, the first component/motor 12, and the second component/battery pack 22.

In FIG. 4, constraints 150 show a possible transition between the set of constraints 58 of FIG. 3 and another set of constraints 158, e.g., due to wear and age of the system 10 shown in FIG. 1. The direction of this change is represented in FIG. 4 by arrows 62. In this example evolution, the SOH of the second component/battery 22 has changed, for instance due to an increase in resistivity in the various cells 21 of FIG. 1 or other factors. Also shown in FIG. 4, the desired performance curve 54 of FIG. 3 has shifted as represented by arrow 60. This shift may occur due to changes in driving behavior and/or driving environment over time. A new optimal operation point 152 is therefore determined dynamically by the controller 30 shown in FIG. 1. The output signal (arrow 31) transmitted by the controller 30 thus optimizes the operation of system 10 in real time so as to ensure operation at the new optimal operation point 152.

Figure 5:
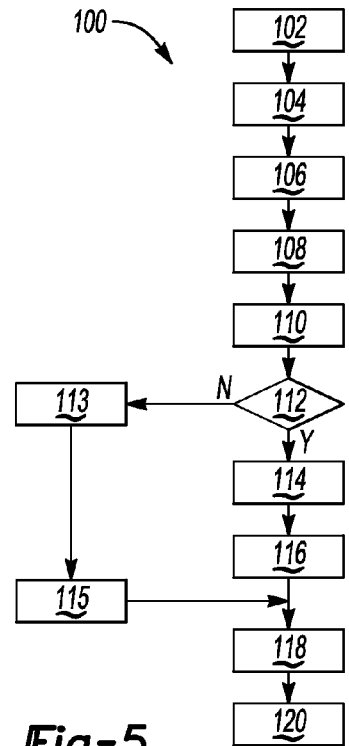
FIG. 5 is a flow chart describing an embodiment of a method for optimizing the performance of the system shown in FIG. 1 in real time using state of health information.

Referring to FIG. 5, an example method 100 may be executed by the controller 30 of FIG. 1. The various steps of the method 100 are therefore explained with reference to the structure of FIG. 1. Those of ordinary skill in the art will appreciate that other systems may be evaluated and controlled using the following approach, such as but not limited to vehicle braking systems, power steering systems, or a powertrain of a vehicle such as the system 10A of FIG. 1A. Some of the steps may be implemented by other devices, e.g., the first, second, and third ECUs 15, 24, and 25, respectively, with results communicated to the controller 30 as needed.

Beginning with steps 102-106, the controller 30 estimates the states of health (SOH) of the respective first component 12, second component 22, and optionally the PIM 14 (third component) and/or any other components as desired. As noted above, modeling, calculating, or otherwise determining the SOH may entail measuring and recording current performance values (arrows 11, 111) and processing the measurements through an SOH model or function. The SOH value that is ultimately determined may be normalized in some embodiments, for instance a value of 1 may be made to correspond to an SOH of a calibrated/new component and an SOH value of 0 to a non-functioning component. Once the individual SOH have been estimated, which may be an ongoing process conducted in a calibrated control loop and monitored over time, the present method 100 proceeds to step 108.

At step 108, the controller 30 uses the system function model 45 to estimate or otherwise determine the SOF, i.e., F(t), of the system 10 as a whole. This value is then recorded in memory 38 of the controller 30 before proceeding to step 110.

At step 110, the controller 30 then estimates the manner in which the system 10 will age, for instance by using the aging models 39 described above. From the aging models 39, the controller 30 estimates and records a remaining useful life of the system 10.

At step 112, the controller 30 determines whether the remaining useful life value determined at step 110 is less than a calibrated threshold, i.e., $\bar{t}$. If so, the method 100 proceeds to step 114. Otherwise, the method 100 proceeds to step 113.

At step 113, the controller 30 determines a control strategy for control of a specific component or components. For example, step 113 may include determining whether and to what extent to limit the power of the second component/battery 22, or to reduce the speed and/or use of the first component/motor 12. In the latter example, when implemented in an HEV, a strategy may include using an engine more than the first component/motor 12 so as to reduce the stress on the motor, thus allowing more time to pass before repairing or replacing the motor. The method 100 then proceeds to step 115.

At step 114, the controller 30 may extract information from the system information (arrow 70) to determine driving style, geographical/topographical information, ambient and/or component temperature, etc. Once the information is extracted, the method 100 proceeds to step 116.

At step 115, the controller 30 sets constraints based on the present control strategy, with example constraints 150 shown in FIG. 4 and explained above. The method 100 then proceeds to step 118.

At step 116, the controller 30 then updates the constraints based on the SOH determined at steps 102-106.

At step 118, the controller 30 dynamically controls performance of the system 10 via passage of output signal (arrow 31) to one or more of the components 12, 14, 22, etc., as explained above. This step implements the particular control strategy that minimizes operating costs, i.e., C(t) noted above, while still producing a threshold level of system function/performance and a threshold remaining useful life of the components. Upon receipt of the output signal (arrow 31), the operating point of system 10 is controlled to conform to the new constraints, e.g., the evolution represented in FIGS. 3 and 4 with respective points 52 and 152.

In an example embodiment of step 118, given the SOH information for the second component/battery 22, charging control may be modified by the controller 30 to maximize fuel economy, e.g., axis 41 of FIG. 2, as well as to prolong the life of the second component/battery pack 22.

In an auto stop/start operation typical of an HEV, for instance, the minimum entry point to auto stop/start is a function of the internal resistance (R) and state of charge (SOC) of the second component/battery pack 22. For a new battery, R is relatively low. Entry to auto start/stop is allowed at a relatively low SOC, e.g., 60% of a maximum SOC. As the battery ages, internal resistance (R) increases and entry to auto start/stop is allowed at a progressively higher SOC. Likewise, generator output voltage for recharging a battery is a function of battery SOC and battery SOH. Thus, the controller 30 may change the rate or other aspect of a charging operation using the output signal (arrow 31) in one possible approach. For lead acid and possibly other types of batteries, this may also help revive or rejuvenate the battery, as understood in the art.

At step 120, the controller 30 then sets a new control calibration such that the new operation point is the baseline, and repeats method 100 beginning with step 102.

While the best modes for carrying out the disclosure have been described in detail, those familiar with the art to which this disclosure relates will recognize various alternative designs and embodiments for practicing the disclosure within the scope of the appended claims.

The invention claimed is:

1. A method for controlling a system having a plurality of components, the method comprising:
   determining, via a controller, a normalized state of health (SOH) value for each of the components, wherein a normalized SOH value of 1 corresponds to a calibrated or new component and a normalized SOH value of 0 corresponds to a non-functioning component;
   determining a state of function (SOF) value of the system as a function of the SOH value of each of the components;
   estimating a remaining useful life of the system using the SOF value of the system;
   estimating a plurality of different component-level costs via a component-level costing model, wherein each component-level cost is an estimated cost of extending the life of a respective one of the components;
   determining, via a system-level costing model, a cost of each of a plurality of different control strategies as a function of the estimated component-level costs;
   selecting a control strategy from the plurality of different control strategies which minimizes operating costs while producing a threshold SOF value and a threshold remaining useful life of the components; and
   dynamically executing the selected control strategy via the controller.

2. The method of claim 1, wherein estimating the remaining useful life of the system includes using an aging model.

3. The method of claim 2, wherein determining the SOF of the system includes processing the SOH value of each of the components and an output of the aging model through a system function model.

4. The method of claim 1, wherein determining the SOH value includes measuring and recording a set of current performance values for each of the components, and then processing the recorded performance values through an SOH model.

5. The method of claim 1, further comprising:
modifying a set of system constraints via the controller when the estimated remaining useful life is less than a calibrated life threshold.

6. The method of claim 1, wherein the system is an electrical propulsion system for a vehicle, and wherein the plurality of components includes an electric traction motor and a battery pack that is electrically connected to the traction motor.

7. A method for controlling a system having a plurality of components, the method comprising:
using a sensor array to measure and record a set of current performance values for each of the components;
calculating, via a controller, a normalized state of health (SOH) value for each of the components by processing the recorded current performance values through an SOH model, wherein a normalized SOH value of 1 corresponds to a calibrated or new component and a normalized SOH value of 0 corresponds to a non-functioning component;
determining a state of function (SOF) value of the system using an SOF model that models an SOF value of the system as a function of the corresponding SOH value of each of the components;
estimating the remaining useful life of the system using the SOF value of the system using an aging model;
processing a set of possible system control strategies through a component-level costing model to thereby estimate the cost of extending the life of a respective one of the components via each of the set of possible system control strategies;
determining, via a system-level costing model, a cost of each of a plurality of different control strategies as a function of the estimated component-level costs;
selecting a system control strategy from the set of possible system control strategies which minimizes operating costs of the system while producing a threshold SOF value and a threshold remaining useful life of the components; and
dynamically executing the selected control strategy via the controller.

8. The method of claim 7, further comprising modifying a set of system constraints when the remaining useful life is less than a calibrated threshold.

9. The method of claim 7, wherein the system is used in a vehicle, and wherein dynamically executing the selected control strategy includes modifying a powertrain control strategy of the vehicle in real time.

10. The method of claim 7, wherein the system is an electrical propulsion system for a vehicle, and wherein the plurality of components includes an electric traction motor and a battery pack that is electrically connected to the traction motor.

11. The method of claim 10, wherein executing the selected system control strategy includes one of: changing a speed of the traction motor and changing a charging or discharging rate of the battery pack.

12. A system comprising:
a first component;
a second component;
a controller in communication with each of the first and second components, wherein the controller is configured to:
determine a normalized state of health (SOH) value for each of the first and second components, wherein a normalized SOH value of 1 corresponds to a calibrated or new component and a normalized SOH value of 0 corresponds to a non-functioning component;
determine a state of function (SOF) value of the system as a function of the SOH value of each of the components;
estimate the remaining useful life of the system using the SOF value of the system;
estimate a plurality of different component-level costs via a component-level costing model, wherein each component-level cost is an estimated cost of extending the life of a respective one of the components;
process a set of control strategies through a component-level costing model to thereby estimate the cost of extending the life of a respective one of the components via-each of the set of possible system control strategies;
determining, via a system-level costing model, a cost of each of a plurality of different control strategies as a function of the estimated component-level costs;
select a system control strategy from the set of possible system control strategies which minimizes operating costs of the system while producing a threshold SOF value and a threshold remaining useful life of the components; and
dynamically execute the selected control strategy.

13. The vehicle of claim 12, further comprising a sensor array in communication with the controller, wherein the sensor array measures a set of current performance values for each of the first and second components and transmits the measured set of current performance values to the controller, and wherein the controller determines the SOH value for each of the components as a function of the measured set of current performance values.

14. The vehicle of claim 12, wherein the controller estimates the remaining useful life of the system using a component-level aging model, and calculates the SOF value of the system by processing the SOH value of each of the components and an output of the component-level aging model using a system function model.

15. The vehicle of claim 12, wherein the first component is an electric traction motor and the second component is a battery pack that is electrically connected to the traction motor.

16. The vehicle of claim 12, further comprising an internal combustion engine, wherein the controller executes the selected system control strategy in part by controlling an operation of the engine when the estimated remaining useful life of one of the motor and the battery is below a calibrated remaining useful life threshold.

* * * * *